May 28, 1968     N. H. ISHLER ET AL     3,385,715
PROCESS FOR PRODUCING COMPRESSED, DEHYDRATED
CELLULAR FOODS
Filed Aug. 31, 1964

INVENTORS
N. H. ISHLER
A. J. KNIPPER
BY *Abner Sheffer*
ATTORNEY

United States Patent Office 3,385,715
Patented May 28, 1968

3,385,715
PROCESS FOR PRODUCING COMPRESSED,
DEHYDRATED CELLULAR FOODS
Norman H. Ishler, Valley Cottage, N.Y., and Aloysius J.
Knipper, Bergenfield, N.J., assignors to Tronchemics
Research Incorporated, South Hackensack, N.J.
Filed Aug. 31, 1964, Ser. No. 393,819
14 Claims. (Cl. 99—204)

ABSTRACT OF THE DISCLOSURE

A process in which morsels of a freeze-dried cellular food are first rehydrated to a moisture content of about 5% to 13%, compressed together while maintaining the surface moisture of the morsels and the pressure sufficiently high to cause the morsels to adhere during said compression and dehydrated to a moisture content below about 3%, the degree of compression being such that the density of the dehydrated product is in the range of about 0.5 to 0.9 gram per cc.

---

This invention relates to the production of compressed food products from highly porous low density dried foods, particularly freeze-dried foods.

Freeze drying of foods is well known to give a high quality product. This quality results from two characteristics of the freeze-drying process: (a) Products to be dehydrated are first frozen and then are introduced into a chamber which can be evacuated. All drying occurs while any water remaining in the substance is in the frozen state. Loss of water occurs by sublimation, wherein the water or moisture content of the material is transformed directly from the solid state (ice) to the vapor phase under such conditions of temperature and pressure that the ice in the product never has an opportunity to melt. Thus the material being dried is never subjected to high temperatures such as are frequently used in other forms of drying; (b) Also, since the water content of the material is not allowed to liquefy during the process, the products being dried are not able to shrink and the structural characteristics are preserved in essentially their original state.

Because of the advantages mentioned above, freeze drying is a preferred method of dehydration for many foods and other substances. The appearance of the dried end-product is essentially the same as that of the starting material, which also adds to the attractiveness of the method of dehydration. Rehydration of freeze-dried material is usually much faster than that resulting from other dehydration methods because shrinkage and case-hardening which frequently occur in other drying methods cannot occur in freeze-dried products. The resulting porous structure of freeze dried foods typically consists of a sponge-like or honeycomb-like structure which water can penetrate very readily when it is desired to rehydrate the product.

Freeze drying offers a means of preservation of substances such as foods without the necessity for sterilization and hermetic sealing as in canning and without the necessity for maintaining products under refrigeration or in frozen storage conditions. For many food substances, the eating qualities of the rehydrated foods are approximately the same as the quality of conventional, commercially frozen foods such as are available on the retail market throughout the United States and in other parts of the world. Frequently, the eating qualities of rehydrated freeze-dried foods are better or more nearly like those of the unpreserved foods than are conventional, commercially canned food products.

Like other dried foods, freeze-dried products are advantageous in applications where the low shipping weight (through absence of water) is important. However, the volume occupied by freeze dehydrated materials is essentially the same as that of the original fresh or cooked product, even though its weight may have been reduced to as little as 10% of the original weight, depending on the moisture content of the starting material (which is generally above about 60%). In addition, the freeze dried foods are very fragile and easily broken unless special precautions are taken in packaging.

It is accordingly an object of this invention to provide a method for producing a novel dried food product having the high eating quality (on rehydration) of freeze-dried foods, but occupying considerably less volume and being more resistant to breakage.

Another object of this invention is the provision of a novel method for the production of new compressed readily rehydratable porous products from a wide variety of foods, e.g. vegetables such as leafy vegetables and legumes, grains, muscle meats, etc.

One aspect of this invention relates to our discovery that freeze-dried food morsels can be partially rehydrated; then compressed to a fraction of their previous bulk and to a compact condition in which the morsels are considerably distorted from their original shapes; then, while so distorted and compact, re-dehydrated to a low moisture content to produce a product which on full rehydration is substantially the same as that obtained on full rehydration of the original freeze-dried food morsels.

The proportions of water employed in the partial rehydration step are generally such as to raise the water content of the freeze-dried food into the range of about 5 to 13%. The exact proportions will depend on the type of food and the other conditions of treatment, as discussed below, but propodtions in the lower portion of this range are prefered.

We have found that for the dehydration step, after the partial rehydration, one need not use expensive and cumbersome freeze-drying procedures, but may employ ordinary methods such as vacuum drying to attain a low water content (e.g. a water content of about 3% or less). Surprisingly, the use of such ordinary drying methods at this stage does not affect the quality of the product after full rehydration.

We have found it advantageous to regulate the conditions of treatment so as to produce a compressed bar in which the morsels are bonded firmly to each others at their surfaces, the bonds between morsels being sufficiently strong to permit handling of the composite product without separation into its components morsels or other fragments. Despite the bonding, the re-dehydration proceeds rapidly without affecting the quality of the product that is eventually obtained on full rehydration of the bonded composite. Also, the bonding makes it possible to redehydrate in an economical manner without the use of any special containers or other devices to maintain the distorted morsels in the interfitting positions to which they have been forced during the compression step. Failure to keep the morsels in these positions will cause a considerable increase in the bulk density.

We have also found that in the partial rehydration step it is advantageous to supply a relatively large amount of moisture to the zones adjacent to the surfaces of the morsels, while keeping the interiors of the morsels at a lower moisture content. In this manner we can attain the desired bonding without the disadvantages which follow from the use of a relatively high moisture content throughout the food, such as the increased cost of dehydrating a product containing the additional water and the adverse effects of too much moisture on the quality of the food, particularly when the subsequent re-dehydration is carried out above the freezing point.

For best results, the bonds between the morsels should not be so strong as to interfere with and delay the full rehydration of the product. The strength of the bond may be described by the time it takes for the morsels of the composite bar to separate when placed in an excess of boiling water and allowed to stand without agitation. For best results, this should be less than 10 minutes, preferably less than 5 minutes. Methods for regulating the strength of the bonds are discussed in detail below.

In the partial rehydration step the added water is conveniently applied by spraying it onto the freeze-dried morsels, preferably as a fine mist. This may be done, for example, while the morsels are spread out in a thin layer on a tray, while they are being tumbled in a mixer, or while they are being conveyed along a belt or other type of conveyor, using a spraying arrangement which applies the mist uniformly to the surfaces of the morsels. Generally it is desirable to allow a short period of time for the mositure to penetrate to those layers of cells which are just below the outermost surfaces of the morsels. With some food morsels, such as free-dried peas and shrimp, the presence of a layer of water on the outermost surfaces of the morsels makes such surfaces too adhesive, so that the bonds formed when such wet morsels are compressed are generally stronger than is preferred; in this case it is often advantageous to reduce the amount of moisture on the outermost surfaces by allowing time for subsurface penetration or by passing a current of relatively dry air over the morsels while the subsurface penetration described above is proceeding. Another technique for avoiding too high a concentration of water at the outermost surfaces is to apply the water in vapor form, as by subjecting the morsels to a current of moist air ( e.g. of relative humidity above about 50% and preferably, to accelerate the treatment, above about 80%) or, if more rapid action is desired, to an amtosphere of steam (e.g. saturated steam at atmospheric pressure or superatmospheric pressure, say 15 p.s.i.); this technique is particularly suitable for the partial rehydration of meat, such as beef. Other food morsels such as corn kernels do not become highly adhesive on simple treatment with limited amounts of water followed by subsurface penetration; in such cases it is sometimes desirable to increase the adhesion of the morsels on compression, without greatly raising the water content, by respraying with water just before compression, and by incorporating a water-soluble edible adhesive, such as a carbohydrate gum, into the water used for treatment of the surface.

The rehydration may also be effected by halting the initial freeze drying of the morsels while said morsels still contain a frozen core from which the water has not yet been removed by drying (the total moisture content at this stage being say 5–13%), then permitting the morsels to stand in a closed container for a sufficient period of time for equilibration to take place so that the moisture from the frozen core penetrates through the remaining thoroughly dehydrated portions of the morsel and becomes more or less evenly distributed. The latter step may be carried out at temperatures below the freezing point of the water, so that the water leaves the frozen core by sublimation; this takes a relatively long time, at atmospheric pressure. However, products of excellent quality may be obtained even when the temperature is well above the freezing point despite the possible existence of some liquid water (at this temperature at atmospheric pressure) in the extreme interiors of the morsels. For example, the freeze drying of peas (at the usual subatmospheric pressures) may be interrupted when the average moisture content of the peas is about 7½% and the peas may then be placed (at atmospheric pressure) in a closed container and kept for several hours at about 70° F. to permits the equilibration. After the water has been redistributed, the morsels may then be compressed, advantageously after a light spraying with water to increase the adhesiveness of their outermost surfaces.

In the compression step any suitable pressure may be employed. The final density of the product and the degree of adhesion of the morsels will be affected by the pressure used and, in some cases, by the direction in which it is applied. For example, in one series of runs with freeze-dried corn, a pressure of 3000 p.s.i.g. gave a product whose ultimate density after redrying was 0.78 gram per cc., when the pressure was 2200 p.s.i.g. this density was 0.72 gram per cc. while a pressure of 1100 p.s.i.g. yielded a product of an ultimate density of 0.58. In general, the pressure used should be such as to give a product of a density in the range of 0.5 to 0.9 gram per cc. It is advantageous to press in a closed mold in which the sides of the mass being compressed are prevented from moving outward. For best results on full rehydration, the amount placed in the mold should be such as to give a relatively thin compressed composite, below 2 inches in thickness, preferably less than 1 inch thick.

Some relaxation or increase in size of the compressed product may be found to occur within a few minutes after the pressure has been released. This may often be prevented if it occurs, by application of a mild restraining force upon the compressed product for a few minutes at most after the product has been released from the mold. In most cases, the compressed bar or product has been found to be essentially stable in its dimensions as soon as the compression has been completed.

The direction in which the pressure is applied can influence the time for full rehydration of the compressed dehydrated products. For example, when diced beef is compressed with the muscle fibers substantially aligned in the direction in which the compression is applied, full rehydration takes place much more rapidly than when the fibers are arranged transversely to the direction in which the compressive force is applied.

When lower pressures are used for the compression step, the bonds between the morsels are generally not as strong as those formed when much higher pressures are employed. Thus bars formed at lower pressures are generally more readily rehydrated but usually less dense than bars produced by the use of higher pressures.

It has been found unnecessary to use elevated temperatures during the compression step. Preferably this step is carried out at a temperature below that which would adversely affect the appearance, performance characteristics, eating characteristics, or storage stability of the end-product. Temperatures below 40° C. are preferred; room temperature is quite satisfactory. However when special effects are desired, for example, if a browned or toasted character should be desired in an end-product, conditions of heating may be used before, during, or after compression in order to achieve the desired character.

The re-dehydrating step is advantageously effected at subatmospheric pressures in order to attain low moisture contents relatively quickly while avoiding exposure of the food to unduly high temperatures. Temperatures below 70° C. are preferred for this step.

Figure 1:
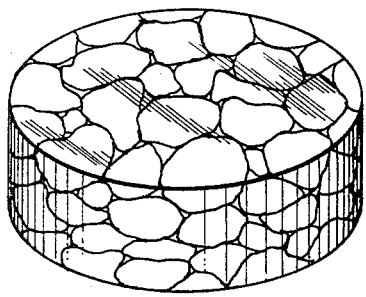
FIGURE 1 is a view of a bar of compressed peas produced in accordance with this invention.
Figure 2:
FIGURE 2 is a view of an individual pea of the bar of FIG. 1.
Figure 3:
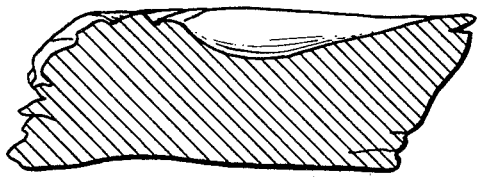
FIGURE 3 is an enlarged cross-sectional view taken along the line 3—3 of FIG. 2, showing the external contour of the pea, but not showing any details of the interior structure.
Figure 4:
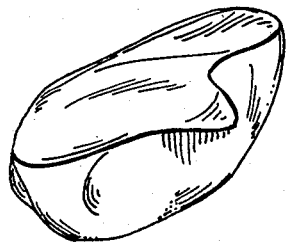
FIGURE 4 is a view of a typical compressed and deformed corn kernel taken from a compressed corn bar produced in accordance with this invention.
Figure 5:
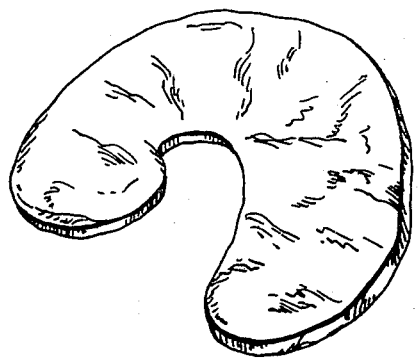
FIGURE 5 is a view of a typical flattened shrimp taken from a compressed bar produced in accordance with this invention.

The following examples are given to illustrate this invention further.

Example I (a) In this example, there were used conventional freeze-dried loose kernels of sweet corn of a size commonly used (e.g. ½" x ⅜"), which had been blanched in boiling water for about 3 minutes before freeze-drying and which had a moisture content of 1.4%. These freeze-dried kernels had substantially the same size and shape as the original undried kernels. The bulk density of a mass of the freeze-dried kernels was 0.19, and the apparent density of the individual kernels was 0.36. The dried kernels were sprayed with a fine mist of a sufficient amount of a 10% aqueous solution of gum arabic to produce a product containing 10.4% water and 1% gum arabic. The particles were then allowed to stand for 30 minutes on a tray open to the atmosphere. At this stage the surface of the corn appeared dry, while the interior of the kernel contained sufficient moisture so that the kernel would yield without breaking when squeezed between one's fingers. Thereafter, the surfaces of the kernels were sprayed uniformly with a fine mist of an additional ½% (based on the weight of the previously moistened corn) of the same 10% gum arabic solution.

Twelve grams of the kernels were then placed in a cylindrical zone having a circular cross-sectional area of 2 square inches in a Carver hydraulic press and subjected at room temperature to a pressure of 1100 p.s.i.g. to produce a compressed bar whose thickness (in the direction the pressure was applied) was about .55 inch and which had parallel top and bottom faces each 2 square inches in area. The press cycle was such that it took 5 seconds to reach the pressure of 1100 p.s.i.g. which was maintained for another 5 seconds, after which the press was opened.

In the compressed bar the kernels adhered to each other. The bar had a relatively smooth surface. While the kernels were individually visible, the crevices or depressions in the surface where the kernels met each other were very shallow (e.g. less than 1 mm.). The compressed bar was dried in a vacuum oven under a pressure of about 1½ inches Hg absolute at oven temperature of 60° C. for 5 hours to reduce the moisture content to 1.5%. The resulting dried bar had substantially the same appearance and occupied substantially the same volume as the compresesd bar before drying and had a density of 0.66 g./cc. It was composed of dried flattened kernels which retained their original yellow color. The bar could be separated into the individual kernels with the fingernails. The bar withstood 3 drops in a "falling ball test" described below without cracking. The dried bar was fully rehydrated by placing it in a beaker containing 150 cc. of boiling water and allowing it to stand without further heating; it thereupon separated into its individual kernels without agitation and the kernels recovered from the flattened state to substantially their original size and shape, all within 5 minutes. The flavor and texture of the product were substantially the same as that obtained by fully rehydrating, in the same way, the original freeze-dried corn without any intermediate steps of partial rehydration, compressing and drying. Substantially no visible fines were observed. On organoleptic evaluation of the fully rehydrated product there was no powdery feel in the mouth.

(b) When Example I(a) was repeated, except that the second spraying was omitted, hte kernels would not retain the bar shape after compression but broke up into individual unfragmented kernels when it was attempted to remove the bar from the mold.

(c) When it was attempted to compress the freeze-dried kernels, without the moisture treatment, the kernels broke up into powder, losing entirely their initial shape and form. On the treatment with boiling water, a large deposit of fine particles was observed at the bottom of the beaker. On organoleptic evaluation there was a distinct powdery feel in the mouth.

(d) When Example I(a) was repeated except that the gum arabic was omitted from the water, the bar was less resistant to cracking in the "falling ball test."

Wet screen analyses for the untreated uncompressed product, the treated compressed product of Example I(a), and the untreated compressed product of Example I(c) are tabulated below. These wet screen analyses were carried out by pouring each rehydrated sample from the beaker used for its rehydration over a stack of five U.S. Standard sieves, the sives being arranged so that the sizes of the screen openings descreased progressively from the top of the stack to the bottom. The top screen was then sprayed with water at room temperature from a perforated plate type of spray nozzle (½ inch in diameter and having 13 substantially uniformly spaced perforations made by a #55 drill) at a rate of 2500 ml./min. until little or no additional material passed through the top screen. The top screen was then removed and the same spraying and screen removal steps were repeated another three times until only the bottom screen remained. During each spraying care was taken to insure that the spraying did not in itself cause fragmentation of the food materials. The material on each screen was then carefully washed quantitatively into an individual beaker, whose contents were then poured onto filter paper in a Buchner funnel together with additional water to remove particles adhering to the beakers and to fill the funnel. Vacuum was then applied and, after the water had gone and air was first heard to pass through the filter paper, the air was drawn through the paper for an additional 15 seconds before the vacuum was disconnected. The papers carrying the separate food fractions were then weighed wet (allowing a tare for the wet filter paper, as determined experimentally).

| U.S. Standard Sieve No. | | Untreated Uncompressed, Percent Retained | Treated Compressed, Percent Retained | Untreated Compressed, Percent Retained |
|---|---|---|---|---|
| Through | On | | | |
| | ⅝ | 56.4 | 55.4 | 0 |
| ⅝ | 5 | 43.6 | 44.6 | 40.2 |
| 5 | 10 | 0 | 0 | 16.4 |
| 10 | 18 | 0 | 0 | 10.6 |
| 18 | 200 | 0 | 0 | 32.8 |

Example II

In this example, there were used conventional freeze-dried loose, sweet peas of the usual size (e.g. ⅜ inch in diameter) which had been blanched, as in Example I, and then freeze-dried to a moisture content of 1.4%. These freeze-dried peas had substantially the same size and shape as the original undried peas. The bulk density of the mass was 0.16 and the apparent density of the individual peas was 0.28 gram/cc.

Microscopic examination of the individual freeze-dried peas showed that, while the skins were substantially intact, they did have some breaks of varying sizes which exposed the insides of the peas to the atmosphere. Some surface areas of the skins carried a white powdery material, which on examination under polarized light appeared to be starch. The skin, which could be separated fairly easily from the compact interior, was composed of two parts or layers, the outer layer being fibrous and the inner layer being quite thin and fragile. The interiors of the peas were composed of dry loose small grains about 150 to 200 microns in diameter.

The dried peas were sprayed with a fine mist of sufficient water to raise their moisture content to 6.4%. After the spraying, the peas were kept for 2 minutes on a tray open to the atmosphere. During this time the outermost surfaces of the peas became drier through loss of moisture to the atmosphere and to the subsurface portions of the peas. Directly after this 2 minute period, 10 grams of the sprayed peas were compressed in the apparatus described in Example I(a) to a thickness of about ½ inch.

Microscopic examination of the peas prior to compression showed that the skin layers were slightly swollen. Some of the grains directly under the thin inner skins were also swollen and were matted together, instead of being loose and dry. The inner and outer layers of the skin were more closely united or bound together than was the case in the dried product previously described. The skin was pliable and almost rubbery in texture.

The compressed bar was dried in a vacuum oven under a pressure of about 1½ inches Hg absolute at an oven temperature of 45° C. for 6 hours to reduce the moisture content to 1.5%. The resulting dried bar had substantially the same appearance and occupied substantially the same volume as the compressed bar before drying and had a density of 0.71 g./cc. It was composed of dried peas, of flattened or rough pyramidal shape, which retained the light green color of the original dried peas. The amount of white material on the surfaces of the skins was slightly greater than that present on the untreated freeze-dried peas; in both cases, however, the amounts were minute. The compressed bar could be separated easily into the individual peas with the fingernails. The surface of the bar was slightly rougher than that of the corn bar described in Example I(a) and the visible crevices were deeper. The bar withstood 5 drops in the "falling ball test." On full rehydration by treatment with boiling water as in Example I(a), the bar separated into its individual peas without agitation and the peas recovered from the flattened state to substantially their original size and shape, all within 5 minutes. The flavor and texture of the product were substantially the same as that obtained by fully rehydrating, in the same way, the original freez-dried peas without any intermediate steps of partial rehydration, compression and drying. Substantially no visible fines were observed. On organoleptic evaluation of this rehydrated product, there was no powdery feel in the mouth. The peas regained the original full green color of undried fresh peas. Microscopic examination of the fully rehydrated products showed that all the grains were swollen and fused into one large mass; the skin was tough and the turgor was marked; the gelatinous mass in the interior was fluid, palpable and contained water bound to the swollen grains, which were about 500 to 600 microns in diameter.

Water at or near the boiling point need not be employed for the rehydration. The compressed and redehydrated bar also becomes fully rehydrated rapidly in excess water at 70° F.

When it was attempted to compress the freeze-dried peas, without the moisture treatment, the peas broke up into powder and pieces of skin and lost entirely their initial shape and form. On the boiling water treatment, a large deposit of fine particles was observed at the bottom of the beaker. On organoleptic evaluation, there was a strong powdery feel in the mouth.

We screen analyses of the rehydrated products gave the following results:

| U.S. Standard Sieve No. | | Untreated Uncompressed, Percent Retained | Treated Compressed, Percent Retained | Untreated Compressed, Percent Retained |
| --- | --- | --- | --- | --- |
| Through | On | | | |
| | 5/16 | 95.0 | 91.6 | 0 |
| 5/16 | 5 | 4.3 | 6.8 | 10.9 |
| 5 | 10 | 0 | .2 | 11.5 |
| 10 | 18 | .7 | .2 | 13.7 |
| 18 | 200 | 0 | 1.2 | 63.8 |

Example III

In this example, there were used commercially freeze-dried loose, shelled, cooked shrimp which had been freeze-dried to a moisture content of 2.2% before freeze drying and which had substantially the same size and shape as the original undried shrimp. The bulk density of shrimp was about 0.12 g./cc. (The actual density of the individual freeze-dried shrimp was about 0.32 g./cc.) The shrimp were sprayed with a fine mist in a sufficient amount to produce a product containing 6.5% moisture. After 15 minutes in a closed container, five of the sprayed shrimp (9.8 g. in this case) were compressed as described in Example I(a) to a thickness of ½ inch to produce a bar made up of individually flattened shrimp. Microscopic examination just before compressing indicated that only the outer most layer of muscle fibers of the shrimp were swollen to a readily observable degree; the other fibers appeared to be of the same size and shape as they did before the treatment with water.

The compressed bar was then dried in a vacuum oven under a pressure of about 1½ inches Hg absolute at an oven temperature of 45° C. for 6 hours to reduce the moisture content to 2.2%. The resulting dried bar had substantially the same appearance and occupied substantially the same volume as the compressed bar before drying and had a density of 0.53 g./cc. It was composed of dried shrimp, flattened, which retained the light pink and white color of the original dried shrimp. The bar could not be readily separated by hand. The shrimp in the bar were oriented so that the curvature of the shrimp was in line with the curvature of the cylindrical bar. In the center of most of the bars produced in this manner there was usually a small hole of not more than ⅛ inch on each side of the flat surface, but the hole did not penetrate through the entire bar.

The bar withstood 10 drops in the "falling ball test." On full rehydration in 100° F. water, the bar separated into its individual shrimp without agitation and the shrimp recovered from the flattened state to substantially their original size and shape before compression, all within 5 minutes. The flavor and texture of the product were substantially the same as that obtained by fully rehydrating, in the same way, the original freeze dried shrimp without any intermediate steps of partial rehydration, compression and drying. Substantially no visible fines were observed. On organoleptic evaluation of the rehydrated product, there was no powdery feel in the mouth.

Instead of using water at 100° F. for the rehydration, one may if desired use water at or near the boiling point as in Example I(a).

When it was attempted to compress the freeze-dried shrimp without the moisture treatment, the shrimp broke up into several pieces. A large deposit of fine particles was observed at the bottom of the beaker. On organoleptic evaluation, the shrimp were found to have lost the typical shrimp texture and, instead, had a discontinuous texture with a very powdery feel in the mouth.

Wet screen analyses of the rehydrated products gave the following results:

| U.S. Standard Sieve No. | | Untreated Uncompressed, Percent Retained | Treated Compressed, Percent Retained | Untreated Compressed, Percent Retained |
| --- | --- | --- | --- | --- |
| Through | On | | | |
| | ⅝ | 99.3 | 95.9 | 0 |
| ⅝ | 5/16 | 0 | 0 | 38.1 |
| 5/16 | 5 | 0 | 0.5 | 4.4 |
| 5 | 10 | 0 | 0.3 | 4.7 |
| 10 | 100 | 0.7 | 3.3 | 52.8 |

Example IV

Raw, cubed (mechanically tenderized) beef (round steak), cut approximately 1″ x 1″ x ½″, was freeze dried to a moisture content of 1.1% to produce a product of substantially the size and shape as the original undried meat; the mass of pieces of dried meat had a bulk density of 0.17 gm./cc.; and the apparent density of each of the individual dried pieces was 0.37 gm./cc. The dried meat pieces were treated with a stream of moist air, having a relative humidity of 88%, at room temperature for approximately 20 minutes; this raised the moisture content of the meat to 7%.

Five pieces of the treated meat were then compressed in the apparatus described in Example I(a) to a thickness of 1.8 cm. All five pieces of meat were oriented with their fibers perpendicular to the platens of the press; i.e. parallel to the direction in which the compression was applied.

The compressed bar containing the five pieces of meat was dried in a vacuum oven under a pressure of about 1½ inches Hg absolute at an oven temperature between 45°–50° C. overnight to reduce the moisture content to 1.1%. The resulting dried bar had substantially the same appearance and occupied substantially the same volume as the compressed bar before drying and had a density of 0.55 gm./sec. It was composed of five pieces of dried meat, of flattened and smooth shape but with deep crevices where the pieces of meat were irregular in shape before compression. The meat appeared to be more brown in color than the original dried meat. The pieces of meat could be easily separated with the fingers. The bar withstood two drops in the "falling ball test." When placed in excess water at 70° F., the five pieces of meat separated and recovered from the flattened state within 5 minutes. At this time, although the morsels were separate from each other and had recovered from the flattened state, the centers of the morsels were still relatively dry; on standing longer in the water full rehydration took place. The fully rehydrated product was somewhat more tender than the corresponding product obtained on full rehydration of uncompressed freeze-dried beef. Very few visible fines were observed. On organoleptic evaluation of the rehydrated product, there was no powdery feel in the mouth.

Instead of using water at 70° F. for the rehydration, one may if desired use water at or near the boiling point as in Example I(a).

When it was attempted to compress the freeze-dried meat without the moisture treatment, the pieces of meat broke up into small pieces and into powder, losing a great deal of their initial shape and form. On rehydration a large deposit of fine particles was observed at the bottom of the beaker. On organoleptic evaluation, the meat had the texture of chopped meat with a distinct powdery feel in the mouth.

Wet screen analyses of the rehydrated products gave the following results:

| U.S. Standard Sieve No. | | Untreated Uncompressed, Percent Retained | Treated Compressed, Percent Retained | Untreated Compressed, Percent Retained |
|---|---|---|---|---|
| Through | On | | | |
| | 5/8 | 99.6 | 98.2 | 0 |
| 5/8 | 5/16 | 0 | 0 | 49.8 |
| 5/16 | 5 | 0 | 0 | 2.1 |
| 5 | 10 | 0 | 0 | .9 |
| 10 | 200 | .4 | 1.8 | 47.2 |

Example V

Commercially frozen spinach leaves were cooked and then freeze dried to a moisture content of 1.3% to produce a product of substantially the same size and shape as the original undried spinach, the mass of dried spinach having a bulk density of 0.16. The dried spinach was sprayed evenly with a fine mist of sufficient water to raise the moisture content to 11.3%, and the sprayed spinach was then left for 30 minutes in a closed container. 9.35 grams of the sprayed spinach were compressed in the apparatus described in Example I(a) to a thickness of 0.43 inch.

The compressed bar was dried in a vacuum oven under a pressure of about 1½ inches Hg absolute at a temperature of 50° C. for 8 hours to reduce the moisture to 1%. The resulting dried bar had substantially the same appearance and occupied substantially the same volume as the compressed bar before drying and had a density of 0.69. The bar was composed of flattened dried spinach which retained the deep green color of the original dried spinach. The bar could not be separated by hand force easily. The bar withstood more than 10 drops in the "falling ball test." The surface of the bar was smooth. On full rehydration by adding about 250 ml. boiling water, the bar separated without agitation and the spinach recovered from the flattened state to substantially the original size and shape, all within 5 minutes. The flavor and texture of the product were substantially the same as that obtained by fully rehydrating, in the same way, the original freeze-dried spinach without any intermediate steps of partial rehydration, compression and drying. Substantially no visible fines were observed. On organoleptic evaluation of the rehydrated product there was no mushy feel in the mouth. The spinach regained the original full green color of undried fresh spinach.

Water at or near the boiling point need not be employed for the rehydration. The compressed and re-dehydrated bar also becomes fully rehydrated rapidly in excess water at 70° F.

When it was attempted to compress the freeze-dried spinach without the moisture treatment, the spinach broke up into small and fine pieces, losing entirely its initial shape and form. On full rehydration treatment, a large deposit of fine particles was observed at the bottom of the beaker. On organoleptic evaluation, there was a soft, mushy feel in the mouth.

Wet screen analyses of the rehydrated products gave the following results:

| U.S. Standard Sieve No. | | Untreated Uncompressed, Percent Retained | Treated Compressed, Percent Retained | Untreated Compressed, Percent Retained |
|---|---|---|---|---|
| Through | On | | | |
| | 5/16 | 99.0 | 97.2 | 31.0 |
| 5/16 | 5 | .7 | 1.4 | 15.5 |
| 5 | 10 | .1 | 0.8 | 10.8 |
| 10 | 18 | .1 | .3 | 17.2 |
| 18 | 200 | .1 | .3 | 25.5 |

In another aspect of this invention, instead of partially rehydrating the freeze-dried morsels, they are treated with a low molecular weight edible liquid water soluble alcohol prior to compression. Thus, all or part of the water used in the partial rehydration may be replaced by a mono- or poly-hydric alcohol such as ethanol, glycerine or 1,2-propylene glycol. The alcohol preferably has a molecular weight below 100 and preferably contains at least one hydroxyl group for each two carbon atoms. Since no added water need be present in this embodiment, there is no need for a re-dehydration step after the compression. On a weight-for-weight basis the alcohol is generally less effective than the water in reducing fragmentation on compression; accordingly larger proportions of alcohol, e.g. in the range of about 5 to 15% (based on the weight of the treated product) are generally employed, and elevated temperatures, e.g. temperatures in the range of about 40 to 60° C., are used in the compression step. If desired the alcohol may be removed during or after compression; ethyl alcohol, because of its relatively high volatility, leaves the compressed food bar readily while polyhydric alcohols may be removed by a suitable vacuum treatment.

Peas containing glycersol have been observed to lose their surface color in a short time. We have found that this effect can be avoided by keeping the glycerol-containing peas in containers which prevent, or reduce, their exposure to light.

The following examples are given to illustrate the use of alcohols.

Example VI

A sample of the same freeze-dried peas as used in Example II, weighing 85 grams, was sprayed uniformly with 15 grams of glycerin, and mixed gently for 2 minutes. The treated peas were then heated in a still air oven at 80° C. for 1½ hours, gently stirring every 15 minutes. Samples of approximately 10 grams were then compressed to a pressure of 1100 p.s.i.g. and held for 5 seconds using a hydraulic press with preheated die and thermostatically controlled plates at 60° C., using the same compression time cycle as in Example I(a). The resulting bar was greener and glossier than the compressed bar of Example II.

The rehydration rate for the compressed glycerin treated bar in boiling water was the same as for an untreated uncompressed sample. During the exposure to the water the bar separated into its individual peas very quickly, in a time well below 5 minutes. The density of the bar was 0.73 gm./cc. as compared to a bulk density of 0.16 gm./cc. for uncompressed peas. The bar withstood more than 10 drops the "falling ball test."

Wet screen analyses for untreated uncompressed, treated compressed, and untreated compressed samples, after rehydration, are tabulated below:

| U.S. Standard Sieve No. | | Untreated Uncompressed, Percent Retained | Treated Compressed, Percent Retained | Untreated Compressed, Percent Retained |
|---|---|---|---|---|
| Through | On | | | |
| | 5/16 | 100 | 92.0 | 0 |
| 5/16 | 5 | 0 | 3.5 | 10.7 |
| 5 | 10 | 0 | 0.1 | 8.7 |
| 10 | 18 | 0 | 0.2 | 7.4 |
| 18 | 200 | 0 | 4.2 | 73.2 |

Example VII

Eighty grams of the freeze-dried corn were sprayed uniformly with 4 grams of propylene glycol and heated in a still air oven at 65° C. for one hour. Samples of approximately 11 grams were then compressed to a pressure of 1100 p.s.i.g. held for 5 seconds, using heated die and plates at 60° C. and the same compression time cycle as in Example I(a).

The density of the compressed treated bar was 0.7 gm./cc. as compared to a bulk density of 0.19 for untreated uncompressed corn. The bar was sufficiently cohesive to withstand three impacts in the "falling ball test." Similar rehydration rates were found for the treated bar and untreated uncompressed corn.

Wet screen analyses for untreated uncompressed, treated compressed, and untreated compressed samples, after rehydration, are tabulated below:

| U.S. Standard Sieve No. | | Untreated Uncompressed, Percent Retained | Treated Compressed, Percent Retained | Untreated Compressed, Percent Retained |
|---|---|---|---|---|
| Through | On | | | |
| | 5/16 | 46.3 | 39.8 | 0 |
| 5/16 | 5 | 53.5 | 57.4 | 51.5 |
| 5 | 10 | 0.2 | 0.9 | 13.1 |
| 10 | 18 | 0 | 0.8 | 10.9 |
| 18 | 200 | 0 | 1.1 | 24.5 |

Example VIII

Ninety grams of screened ¼" freeze-dried chicken cubes containing less than 2% moisture were sprayed uniformly with 10 grams of propylene glycol and heated in a still air oven at 60° C. for one hour. Samples of approximately 10 grams were then compressed to a pressure of 1100 p.s.i.g. for a period of 5 seconds, using a heated die and plates at 60° C. and the same compression time cycle as in Example I(a).

The compressed bar had a density of 0.72 gm./cc. as compared to a bulk density of 0.23 gm./cc. for untreated uncompressed chicken. The treated bar was sufficiently cohesive to withstand ten impacts in the "falling ball test."

Wet screen analyses for rehydrated untreated uncompressed, treated compressed, and untreated compressed products are tabulated below:

| U.S. Standard Sieve No. | | Untreated Uncompressed, Percent Retained | Treated Compressed, Percent Retained | Untreated Compressed, Percent Retained |
|---|---|---|---|---|
| Through | On | | | |
| | 5/16 | 98.7 | 87.7 | 41.5 |
| 5/16 | 5 | 1.3 | 4.6 | 14.4 |
| 5 | 10 | 0 | 0.7 | 2.2 |
| 10 | 18 | 0 | 0.8 | 4.1 |
| 18 | 200 | 0 | 6.2 | 37.8 |

Another aspect of this invention relates to the use of the techniques described above for the treatment of other porous dehydrated foods. Thus we have found that these partial rehydration, compression and re-dehydration techniques may be employed for the treatment of porous quick-cooking rice, such as the rice described in U.S. Patents 2,696,156 and 2,696,158. These patents describe processes for the treatment of rice which comprise the heating of unbroken raw rice grains to provide said rice grains with fissures followed by subjecting the fissured rice grains to moisture and heat to gelatinize them and cause them to soften and swell, followed by drying the swollen grains by removing moisture from their surfaces at a rate faster than it can diffuse to the surfaces from the interiors, so as to set the grains in their enlarged condition and produce a porous structure. We have been able to reduce the bulk of this quick-cooking rice to a considerable extent while retaining its desirable qualities of rapid rehydration and quick cooking.

Instead of using quick-cooking rice, we may employ other similar dehydrated foods which have the unshrivelled shape characteristic of the undehydrated food and which are so brittle that on compression they yield a large proportion of fines. Among such products are beans, wheat, sorghum and barley, and other cereal grains which have been dehydrated by processes of the same type as that described above in connection with rice. Other porous dehydrated foods which may be employed are puff-dried products, such as puff-dried beans or carrots, which are obtained in well known manner by heating a partially dehydrated product under pressure to the point where the vapor pressure in the product is in excess of atmospheric pressure, followed by a sudden release of the pressure, causing the moisture to leave the product very rapidly and puffing up the product.

The following example illustrates further the above aspects of this invention.

Example IX 90 grams of grains of "Minute Rice" (precooked rice prepared in accordance with U.S. Patents 2,696,156 and 2,696,158) having about 8% moisture were sprayed uniformly with a fine mist of a 10% gum arabic solution in water until 10 grams of solution had been deposited. The sprayed grains were then spread out under a fan 12 inches above the rice for 5 minutes in order to dry the outermost surface of the grains. Samples of approximately 20 grams were then compressed in the manner set forth in Example I at room temperature and dried in a vacuum oven at a pressure of 1½ inches Hg absolute for 5 hours at an oven temperature of 70° C. to a final moisture of 3.9%.

The treated bar had a density of 0.71 gm./cc.; the bulk density of the original Minute Rice was 0.39 gm./cc. and the apparent density of each of the individual Minute Rice grains was about 0.77 gm./cc. The treated bar was sufficiently cohesive to withstand three impacts in the "falling ball test." The rehydration rate in boiling water for the treated compressed bar and untreated uncompressed rice was the same. Separation of the rice grains occurred on such rehydration within 5 minutes.

Wet screen analyses for untreated uncompressed, treated compressed, and untreated compressed samples, after rehydration, are tabulated below:

| U.S. Standard Sieve No. | | Untreated Uncompressed, Percent Retained | Treated Compressed, Percent Retained | Untreated Compressed, Percent Retained |
|---|---|---|---|---|
| Through | On | | | |
| | 5 | 70.4 | 51.0 | 0 |
| 5 | 10 | 28.1 | 41.2 | 36.5 |
| 10 | 18 | 1.0 | 2.3 | 28.0 |
| 18 | 35 | 0.5 | 3.8 | 22.9 |
| 35 | 100 | 0 | 1.7 | 12.6 |

While a cylindrical mold was used in the foregoing examples, it will be appreciated that any other shape of mold may be employed, as desired. For example, better utilization of space may be attained by the use of molds which give bars that are square or rectangular in cross-section, so that such bars may fit together when packed without any waste space. The size and weight of the bar may be predetermined so that each bar will produce on rehydration an amount of foods corresponding to a commonly accepted fraction of the usual serving portion. Thus each bar of compressed precooked rice may be of such weight that when cooked it will produce one cup of cooked rice; this will enable the housewife or other user of the compressed bar to dispense with the use of measuring cups or other measuring devices since the quantity of compressed food to be used at any given time can be readily determined by merely counting out the required number of bars of compressed food.

In the "falling ball test" the composite bar to be tested is placed on a cast iron plate and a steel ball weighing 28.2 grams is dropped from a height of 10 inches onto the center of the bar. The number of drops necessary to crack or break the bar is reported.

Bulk densities, referred to in the above examples, are determined in conventional manner by placing the morsels in a container, tapping the container until there is no significant decrease in the volume occupied by the mass of morsels on continued tapping, and measuring the volume occupied by the mass. Apparent densities of the individual morsels were determined by weighing the morsels, coating the morsels with a film of molten paraffin to seal their surfaces, immersing the coated morsels completely in water and measuring the volume of water displaced, in any suitable manner. The apparent density is taken as equal to the weight of the uncoated morsels divided by the volume of water displaced.

The apparent density figure for the "Minute Rice" (Example IX above) indicates that the principal effect of the compression treatment is a distortion of the rice grains so that they interfit closely.

As previously indicated, the optimum degree of partial rehydration before compression depends on the particular food being treated. Thus the amount of moisture added should not be so great as to bring the food to a state from which it will shrink on subsequent dehydration. In the case of freeze-dried foods, the moisture content on partial rehydration is usually in the range of 5 to 13%. For puff-dried or quick-dried foods such as the rice described in Example IX, the range of moisture contents on partial rehydration is higher, e.g. about 15 to 18%.

By the use of this invention, it is possible to produce porous food products of relatively high density (in the range of 0.5 to 0.9 g./cc.) and of such low water content that they are stable without refrigeration for long periods of time. Advantageously, the products made from freeze-dried morsels have moisture contents not greater than 3%, for example about 1 to about 2½% moisture. Advantageously, the products made from porous, brittle, foods dehydrated by methods other than freeze-drying have moisture contents below about 12%. As previously discussed, the products retain the desirable flavor and texture of the original freeze-dried material, on rehydration.

The products may be packaged for shipment or storage in any suitable manner, preferably in wrappings or containers substantially impervious to the water vapor of the atmosphere.

It is to be understood that the foregoing detailed description is given merely by way of illustration, and that variations may be made therein without departing from the spirit of this invention.

The embodiments of the invention in which an exclusive property or privilege is claimed are defined as follows:

1. A process which comprises partially rehydrating morsels of a freeze-dried cellular food, the water content of the morsels after such rehydration being in the range of about 5 to 13%, compressing the partially rehydrated morsels together while maintaining the surface moisture of said morsels and the pressure sufficiently high to cause said morsels to adhere during said compression, and dehydrating the resulting compressed products to a moisture content below about 3%, the degree of compression being such that the density of the dehydrated product is in the range of about 0.5 to 0.9 gram per cc.

2. A process as set forth in claim 1 wherein the pressure is in the range from about 1100 p.s.i.g. to about 3000 p.s.i.g.

3. A process as set forth in claim 1 in which the moisture content at the zones of the morsels adjacent their surfaces just prior to compression is greater than the average moisture content of the morsels.

4. A process as set forth in claim 3 and including a step of moistening the surfaces of the morsels after said rehydration and prior to said compression.

5. A process as set forth in claim 3 in which the surfaces of said morsels carry an added adhesive.

6. A process as set forth in claim 5 in which said adhesive is a vegetable gum.

7. A process as set forth in claim 1 in which, in the step of partially rehydrating said morsels, water is applied to the outermost surfaces of said morsels and the concentration of water at said outermost surfaces is reduced prior to said compression.

8. A process as set forth in claim 7 in which said morsels are shrimp.

9. A process as set forth in claim 7 in which said morsels are green peas.

10. A process which comprises partially rehydrating brittle, porous, water-softenable morsels of a dehydrated cellular food, the water content of the morsels after such partial rehydration being in the range of about 15 to 18%, said brittle morsels having the unshrunken and unshrivelled shape characteristic of the food before dehydration, compressing the partially rehydrated morsels together while maintaining the surface moisture content of said morsels and the pressure sufficiently high to cause said morsels to adhere during said compression, and dehydrating the resulting compressed composite product to a moisture content below about 12%, the amount of moisture added in said rehydration being sufficient to soften said morsels enough to permit said compression without substantial fragmentation but insufficient to so hydrate said food so that it will shrink on said subsequent dehydration, the degree of compression being such that the density of the dehydrated product is in the range of about 0.5 to 0.9 gram per cc.

11. A process as set forth in claim 10 in which said brittle, porous morsels which are the starting materials of the process are cereal grains which have been subjected to moisture and heat to gelatinize them and cause them to soften and swell and then have been dried by removing moisture from their surfaces at a rate faster than it can diffuse to said surfaces from their interiors so as to set said grains in their enlarged condition and produce a porous structure.

12. Process as set forth in claim 10 in which said morsels are quick-cooking rice grains.

13. A process as set forth in claim 10 wherein the pressure is in the range from about 1100 p.s.i.g. to about 3000 p.s.i.g.

14. A process which comprises applying about 5 to 15% of a water-soluble liquid polyhydric alcohol to a freeze-dried cellular food, permitting said alcohol to penetrate into said morsels, and compressing the resulting treated morsels together under such conditions as to produce a composite product having a density in the range of about 0.5 to 0.9 gram per cc. and a moisture content below about 3%.

References Cited

UNITED STATES PATENTS

| | | | |
|---|---|---|---|
| 2,365,890 | 12/1944 | McBean | 99—204 |
| 2,445,752 | 7/1948 | Adams | 99—171 |
| 2,696,156 | 12/1954 | Campbell et al. | 99—80 |
| 2,877,122 | 3/1959 | Hiller | 99—209 |
| 3,261,694 | 7/1966 | Forkner | 99—199 |

RAYMOND N. JONES, *Primary Examiner.*